Figure 1:
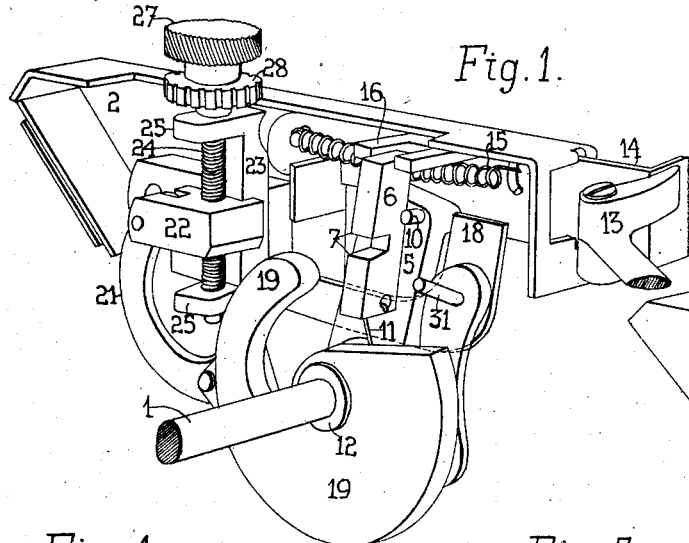

R. W. UHLIG.
TYPE WRITING MACHINE.
APPLICATION FILED AUG. 26, 1909.

970,668. Patented Sept. 20, 1910.

WITNESSES
Sigmund Schiff
K. Frankfort

INVENTOR
Richard W. Uhlig
By B. L. Stickney
ATTORNEY

THE NORRIS PETERS CO., WASHINGTON, D. C.

UNITED STATES PATENT OFFICE.

RICHARD W. UHLIG, OF RUTHERFORD, NEW JERSEY, ASSIGNOR TO UNDERWOOD TYPEWRITER COMPANY, OF NEW YORK, N. Y., A CORPORATION OF NEW JERSEY.

TYPE-WRITING MACHINE.

970,668.          Specification of Letters Patent.     Patented Sept. 20, 1910.

Application filed August 26, 1909.   Serial No. 514,706.

*To all whom it may concern:*

Be it known that I, RICHARD W. UHLIG, a citizen of the United States, residing in Rutherford, in the county of Bergen and State of New Jersey, have invented certain new and useful Improvements in Type-Writing Machines, of which the following is a specification.

This invention relates to line-spacing mechanism for typewriters, the object being to provide novel means for spacing the lines of writing uniformly at any desired intervals within the range of adjustment.

My invention provides a simple, inexpensive, yet strong and effective line-spacing mechanism, whereby the operator can regulate conveniently and accurately the interval to be preserved between successive typewritten lines.

The invention is illustrated in connection with the Underwood type of front strike writing machine, in which the line spacing lever is used for returning the carriage to the beginning of a new line. In this invention I have interposed a novel clutch mechanism between the line-spacing lever and the platen, and have associated therewith a regulating mechanism whereby the throw of the platen is absolutely controlled and overthrow thereof prevented.

In carrying out my invention, I provide upon the platen axle, a wheel having a flange and serving as the line-space wheel for variable line-spacing. The clutching device comprises a dog having jaws to bite this flange. The usual line-spacing and carriage-returning lever of the Underwood machine is connected with said dog in a manner to cause it, first, to bite the flange, and then, to carry the wheel around the required distance, together with the axle and platen. It will be understood that the clutching dog is normally disengaged from the wheel to permit backward or forward rotation of the platen. The dog is pivoted at a point close to its jaws upon an arm or carrier, which turns around the platen axle, and said lever is connected to the dog in a manner to give the lever considerable purchase thereon, to secure the required bite of the jaws on the wheel flange.

The arresting of the clutch devices, the line-space wheel and the platen, which is a matter of considerable importance in this particular variety of typewriter construction, is effected by a stop which engages said dog in a manner to cause the latter to bite the flange still harder at the moment of arrest of the platen, thereby preventing or making difficult any overthrow of the platen, so that uniformity of line-feeding is secured.

Preferably the stop which arrests the dog, line-space wheel and platen, is mounted for fine adjustment around the platen axle, and a regulating screw is mounted upon the platen frame and is connected to said stop to adjust the same; said screw being vertically immovable, and threaded through a block to shift the latter up and down, the block being connected by a link to said adjustable stop to control the same. I provide a click to engage a toothed wheel on said screw, to hold the same in adjusted position and also to give the operator an idea, by counting the clicks as he turns the screw, how far he has adjusted the stop. As a further aid to the operator, the stop is provided with an index, and a scale is provided upon the platen frame having graduations corresponding preferably with the usual line-spacing of typewriting machines.

Figure 2:
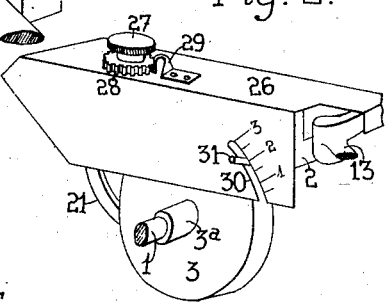
Figure 4:
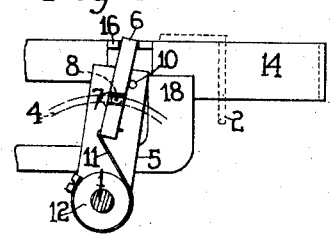
Figure 5:
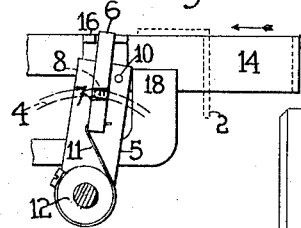
Figure 3:
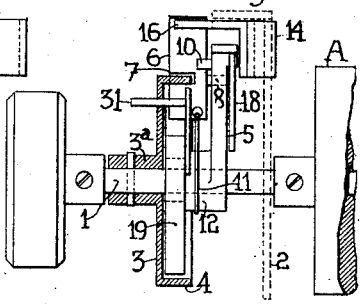
Figures 6, 7, 8:
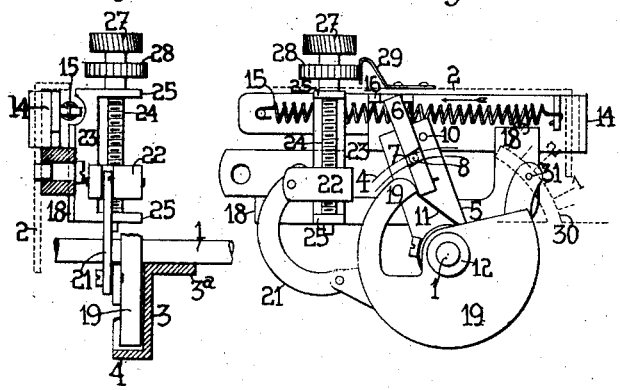

In the accompanying drawings, Figure 1 is a perspective view of one embodiment of my invention applied to the Underwood style of front strike writing machine, a part of the platen frame and a part of the clutch being omitted. Fig. 2 is a perspective view reduced in size, showing the invention with the platen frame intact. Fig. 3 is a part sectional detail front view, parts being omitted to better disclose the construction. Figs. 4 and 5 are detail side views showing, respectively, the positions of the clutching dog relative to the stops when the dog is at rest, and when in engagement with the rim of the wheel constituting the coöperating clutch member. Fig. 6 is a part sectional detail rear view of the regulating mechanism. Figs. 7 and 8 are detail side views showing the relative positions of the regulating and clutch mechanisms at the completion of the spacing stroke under various adjustments of the regulating mechanism.

A indicates a platen, having an axle 1 journaled in the ends of a platen frame 2. A wheel or disk 3 is fastened by sleeve 3ª to the axle 1 of the platen to turn therewith. This wheel has an annular flange or rim 4, received between the jaws 7 of a clutching dog 6 pivoted intermediate its ends by a pin 8, to a carrier 5 loosely mounted on the axle 1. The dog is pivoted to its carrier at a point substantially in alinement with the jaws, which brings the jaws close to the axis of rotation of the dog and enables the jaws to obtain a powerful grip or bite on the flange or rim when the dog is operated.

A spring 11 on the carrier is connected to the inner end of the clutching dog and constantly tends to automatically throw the jaws 7 into operative engagement with the flange 4 of the wheel, whereby to save time in the operation of the line-spacing mechanism and prevent the possibility of slippage, which might otherwise occur if the engagement of the dog and flange depended upon the manual vibration of the dog on its carrier. Normally, however, the dog is yieldingly maintained in released position, and the swinging carrier is also yieldingly held against an abutment 18, by a spring 15 operating on the dog through a slide 14, having a fork or arm 16 loosely embracing the outer end of the clutching dog, and in such position, the outer end of the dog rests against a back stop or check 10 on the carrier. The returning spring 15 is stronger than the dog-actuating spring 11 and is itself overcome when the usual Underwood type of line-spacing lever 13*operatively engaging the slide 14, is actuated by the hand of the operator.

When the lever 13 is operated, the slide 14 and fork 16 are moved against the tension of the returning spring 15, thereby relieving the dog 6 and its spring 11 from the influence of the return spring, to permit the weaker spring 11 to automatically vibrate the dog 6 on its pivot 8, (because of the loose connection between the dog and slide) and cause the jaws to operatively engage and bind upon the flange 4 of the wheel, whereupon the fork (which moves in the same general direction as does the outer end of the dog when influenced by the spring 11), pushes against such outer end to press it still harder in the direction in which it was actuated by the spring, to rotate the dog, its carrier 5 and the wheel 3 all together with the axle 1 to advance the platen the required distance.

By effecting the automatic engagement of the clutching dog and flange 4 at or before the application of pressure to advance the platen, I prevent the possibility of slip between the dog and wheel during the line-spacing stroke and preserve the accuracy of the intervals. I prefer to provide a line-space stop 19, in the path of the inner end of the clutching dog, to arrest the throw of the dog and platen.

The temporary pressure upon the outer end of the arrested clutching dog, applied through the lever 13, slide 14 and fork 16, and due to the momentum of the operator's hand, causes the jaws to increase their bite upon the flange of the wheel, and prevents or renders difficult any overthrow of the wheel and platen. By thus intensifying the strength of the bite or grip of the clutching dog upon the flange 4 of the wheel, at the moment of arrest of the dog, the wheel is caused to remain in engagement with the dog, instead of being jarred loose therefrom and given an overthrow by the abrupt stoppage of the dog, which constitutes an actuator for the wheel and the thereto-connected platen. Also such strengthening of the bite by the impact of the dog with the stop operates to overcome the momentum of the platen and wheel. Upon releasing the handle 13, the returning spring 15 moves the slide 14 and fork 16 forward, releasing the dog from the wheel and causing it to return to normal position.

The stop is journaled preferably on the hub 12 of the carrier, to be adjustable along a path corresponding to the arc of movement of the clutching dog, thus giving a great range of adjustment to the stop, and securing uniformity of action at all adjustments.

The stop is connected by a link 21 to an adjustable head 22 grooved to be received and slide upon a guide way 23 secured to the end frame 2 of the platen. A vertical screw 24 is threaded through the head 22, and mounted in lugs 25. Rotation of the screw will cause the head 22 to travel up and down, its movement being communicated through the link to the stop 19, whereby the latter is rotated to vary the throw of the dog and platen; two such adjustments being shown in Figs. 7 and 8 respectively. The screw passes up through a casing 26 on the end of the platen frame, and has a knurled head 27 convenient to the operator. The screw also carries a notched disk 28, with which engages a resilient tooth or click 29 on the casing 26 to hold stop 19 where adjusted, and to apprise the operator aurally of the number of steps the screw is rotated when making fine adjustments, that is, of the number of micrometer line-spaces for which the device is set.

The casing 26 may be provided with a curved slot 30, suitably graduated, to receive a pointer 31 connected to the space-regulating mechanism, and preferably mounted upon the stop 19; the pointer and scale enabling the operator to determine the width of the interval between the successive typewritten lines.

Variations may be resorted to within the scope of the invention, and portions of the improvements may be used without others.

Having thus described my invention, I claim:

1. In a typewriting machine, the combination with a platen, of a line-space mechanism including a wheel connected to the platen and having an annular flange or rim, a dog carrier pivoted concentrically with said wheel, a dog upon said carrier, and having jaws to bite upon opposite sides of said flange or rim, said dog pivoted in proximity to said jaws and having an operating arm, a lever, and a connection between said lever and said operating arm, to drive the latter in a direction to advance the platen.

2. In a typewriting machine, the combination with a platen, of a line-space mechanism including a wheel connected to the platen and having an annular flange or rim, a dog carrier pivoted concentrically with said wheel, a dog upon said carrier, and having jaws to bite said flange or rim, said dog pivoted in proximity to said jaws and having an operating arm, a lever, a connection between said lever and said operating arm, to drive the latter in a direction to advance the platen, and a stop to engage said dog.

3. In a typewriting machine, the combination with a platen, of a line-space mechanism including a wheel connected to the platen and having an annular flange or rim, a dog carrier pivoted concentrically with said wheel, a dog upon said carrier, and having jaws to bite said flange or rim, said dog pivoted in proximity to said jaws and having an operating arm, a lever, a connection between said lever and said operating arm, to drive the latter in a direction to advance the platen, a stop to engage said dog, and means upon said carrier to limit the vibration of the dog thereon.

4. In a typewriting machine, the combination with a platen, of a line-space mechanism including a wheel connected to the platen and having an annular flange or rim, a dog carrier pivoted concentrically with said wheel, a dog upon said carrier, and having jaws to bite said flange or rim, said dog pivoted in proximity to said jaws and having an operating arm, a lever, a connection between said lever and said operating arm, to drive the latter in a direction to advance the platen, a stop to engage said dog, means upon said carrier to limit the vibration of the dog thereon, and means for effecting fine adjustments of said stop.

5. In a typewriting machine, the combination with a platen, of a line-spacing mechanism including a clutch element, operatively connected with the platen, a clutching dog pivotally supported intermediate its ends on a swinging carrier, and having normally disengaged jaws to bite on the clutch element, a lever-actuated arm engaging the clutching dog on one side of its pivotal support for causing the jaws to bite upon the clutch element to rotate the platen, and a stop for arresting the travel of the dog and the thereto-connected clutch element and platen, the stop located in the path of movement of the dog to engage the dog on the opposite side of its pivotal support from the arm, to intensify the bite of the dog on the clutch element at the moment of arrest of the dog and platen.

6. In a typewriting machine, the combination with a rotatable platen, of a line-spacing mechanism including a clutch element connected to the platen, a coöperating clutch member freely movable relatively to the platen, a lever for actuating the clutch member to rotate the platen, and means, including a stop, to coöperate with the clutch member both to arrest the spacing movement of the latter and also to increase its grip upon the platen-connected clutch element to prevent overthrow of the platen.

7. In a typewriting machine, the combination with a platen, of line-spacing mechanism therefor, including a wheel operatively connected with the platen, a swinging carrier, a vibratory dog supported thereon, and having normally disengaged jaws to bite the wheel, a lever for vibrating the dog to cause it to grip the wheel, and a check with which the dog normally contacts when in inactive position, and a spring to press said dog against said check, thereby to hold the dog in released position.

8. In a typewriting machine, the combination with a platen, of line-spacing mechanism therefor, including a wheel operatively connected with the platen, a swinging carrier, an abutment with which the carrier normally contacts, a vibratory dog pivoted on the carrier, and provided with normally disengaged opposing jaws to bite upon opposite portions of the wheel, lever-operated means for vibrating the dog to grip the wheel, and for subsequently effecting the rotation of the latter and the platen, and a stop for limiting the throw of the platen.

9. In a typewriting machine, the combination with a platen, of a line-spacing mechanism including a clutch-element operatively connected with the platen, and provided with a rim or flange, a swinging carrier, a vibratory dog on the carrier, having opposing jaws adapted to bite upon opposite sides of the flange, a spring-actuated arm operatively connected with the dog for normally retaining its jaws disengaged from the flange to permit the platen to be freely rotated back and forth, and a lever for actuating the dog against the tendency of the spring to engage and rotate the platen-connected clutch element.

10. In a typewriting machine, the combination with a platen, of a clutch-member operatively connected therewith, a swinging carrier, a vibrating dog on the carrier to engage the wheel, a clutch-actuating lever, and a stop mounted for rotative adjustment in an arc coincident with the arc of movement of the dog for limiting the throw of the platen.

11. In a typewriting machine, the combination with a platen, of a line-spacing mechanism including a clutch-element operatively connected with the platen, a vibratory dog to engage the clutch-element, a swinging carrier on which the dog is mounted, a returning-spring for normally retaining the dog released from the clutch-element, a second spring tending to throw the dog into engagement with the element, and a lever for actuating the dog carrier against the tension of the returning spring to effect the rotation of the platen.

12. In a typewriting machine, the combination with a rotatable platen, of a line-spacing mechanism including a clutch-element connected with the platen, a coöperating clutch-member for actuating the platen-connected element, a lever for operating the clutch-member to cause it to engage and rotate the clutch-element and platen, an adjustable stop engaged by the clutch-member to afford fine adjustments of the line-spacing movements of the platen; and indicator devices to automatically indicate the spacing intervals for any adjustment of the stop.

13. In a typewriting machine, the combination with a rotatable platen, of a line-spacing mechanism including a clutch-element connected with the platen, a coöperating clutch member for actuating the element, a lever for operating the clutch-member to cause it to engage and rotate the clutch-element and platen, an adjustable stop lying in the path of travel of the clutch-member to control the line-spacing, and an indicating device connected to move with the stop.

14. In a typewriting machine, the combination with a rotatable platen, of a line-spacing mechanism including a wheel connected to the platen, and provided with a rim or flange, a swinging carrier, a dog having opposing jaws to bite on opposite sides of the rim or flange, and pivotally supported on the carrier, a check for limiting the pivotal movement of the dog thereon, an arm for operating the dog and carrier successively to cause the jaws to first bite the rim and flange, and subsequently to rotate the dog, its carrier and the wheel all together, and a lever for actuating the arm to advance the platen.

15. In a typewriting machine, the combination with a platen, of a line-spacing mechanism including a wheel for operating the platen, and having a rim or flange thereon, a swinging carrier, a dog pivotally supported on the carrier, and having opposing jaws to bite the opposite sides of the flange or rim, a fork embracing the dog, and a lever for actuating the fork to vibrate the dog until it has clutched the wheel.

16. In a typewriting machine, the combination with a platen, of a line-spacing mechanism including a wheel for operating the platen, and having a rim or flange thereon, a swinging carrier, a dog pivotally supported on the carrier, and having opposing jaws to bite opposite sides of the flange or rim, a spring, an abutment against which the carrier is normally held in released position by the spring, and means operable against the tendency of the spring for vibrating the dog to cause it to bite upon the wheel and subsequently swing the dog and carrier together to rotate the wheel and platen.

17. In a typewriting machine, the combination with a platen, of a clutch-element operatively connected with the platen, a swinging carrier having a hub, a dog pivotally mounted on the carrier, and provided with jaws to bite the clutch-element, a lever for actuating the dog to cause it to bite upon the clutch-element and then to swing the carrier to rotate the platen, a stop journaled on the hub of the carrier and lying in the path of movement of the dog, and means for adjusting the position of the stop.

18. In a typewriting machine, the combination with a platen, of a clutch-element operatively connected with the platen, a swinging carrier, a dog pivotally mounted on the carrier and provided with jaws to bite the clutch-element, a lever for actuating the dog to cause it to bite upon the clutch-element, and then to swing the carrier to rotate the platen, and a stop extending into the path of movement of the dog.

19. In a typewriting machine, the combination with a platen, of a line-spacing mechanism comprising a clutch-element connected to operate the platen, a swinging clutch-member, a lever for operating the clutch-member to cause the operation of the clutch-element, a swinging stop journaled to move about the same axis as the clutch-member, the stop lying in the path of movement of the clutch-member, and an adjustment for regulating the position of the stop.

20. In a typewriting machine, the combination with a platen, of a micrometer line-spacing device, including clutch-members for actuating the platen, a lever for actuating the clutch-members, a screw regulator whereby the throw of the platen is finely controlled, and a click engaging the regulator for informing the operator of the number of micrometer line-spaces to which the device is adjusted.

21. In a typewriting machine, the combination with a platen, of clutch-members for effecting the rotation of the platen, a lever for actuating the clutch-members, a stop engaged by one of the clutch-members for limiting the advance rotation of the platen, a regulating mechanism for the stop, a click for releasably holding the regulating mechanism in adjusted position, and an index connected with the regulating mechanism for indicating the throw of the platen for any adjustment of the stop.

22. In a typewriting machine, the combination with a platen, of a line-spacing mechanism comprising a clutch including two coöperating members, one of which is connected to actuate the platen, a clutch-operating lever, a stop lying in the path of movement of one of the clutch members to be engaged thereby, and an adjustable element with which the stop is operatively connected.

23. In a typewriting machine, the combination with a platen, of a line-spacing mechanism comprising a clutch including two coöperating members, one of which is connected to actuate the platen, a clutch-operating lever, a stop lying in the path of movement of one of the clutch members to be engaged thereby, an adjustable head with which the stop is operatively connected, and click devices for releasably holding the head in any of its adjusted positions.

24. In a typewriting machine, the combination with a platen, of a line-spacing mechanism comprising a clutch including two coöperating elements, one of which is connected to actuate the platen, a clutch-operating lever, a stop lying in the path of movement of one of the clutch elements to be engaged thereby, an adjustable head, and a link connecting the adjustable head and the stop.

25. In a typewriting machine, the combination with a platen, of a line-spacing mechanism comprising a clutch including two coöperating elements, one of which is connected to actuate the platen, a clutch-operating lever, a stop lying in the path of movement of one of the clutch elements to be engaged thereby, an adjustable head operatively connectd with the stop, and indicator devices actuated by the adjustment of the head to indicate the line-spacing intervals.

26. In a typewriting machine, the combination with a platen, a line-spacing mechanism including clutch-members, one of which is connected to actuate the platen, and a clutch-actuating lever operatively connected with the remaining clutch-member to effect the rotation of the platen, of a stop lying in the path of one of the clutch-members to arrest the throw of the platen, a slidable head operatively connected to the stop, and means for sliding the head in one direction or the other to vary the position of the stop.

27. In a typewriting machine, the combination with a platen, a line-spacing mechanism including clutch-members, one of which is connected to actuate the platen, and a clutch-actuating lever operatively connected with the remaining clutch-member to effect the rotation of the platen, of a stop lying in the path of one of the clutch-members to arrest the throw of the platen, a slidable head operatively connected to the stop, and a screw operatively engaging the head to move the latter back and forth to vary the position of the stop.

28. In a typewriting machine, the combination with a platen, a line-spacing mechanism including clutch-members, one of which is connected to actuate the platen, and a clutch-actuating lever operatively connected with the remaining clutch-member to effect the rotation of the platen, of a stop lying in the path of one of the clutch members to limit the throw of the platen, a slidable head operatively connected to the stop, a screw operatively engaging the head for moving the latter back and forth to vary the position of the stop, and click devices for releasably holding the screw in adjusted position.

29. In a typewriting machine, the combination with a platen, a line-spacing mechanism including clutch-members, one of which is connected to actuate the platen, and a lever operatively connected with the remaining clutch-member to effect the rotation of the platen, of a stop lying in the path of one of the clutch-members to limit the throw of the platen, a slidable head operatively connected to the stop, a screw operatively engaging the head for moving the latter back and forth to vary the position of the stop, a notched disk connected with the screw, and a resilient tooth engaging the disk.

30. In a typewriting machine, the combination with a platen, line-spacing mechanism therefor, including clutch-members, one of which is operatively connected to the platen, and a lever for actuating the remaining clutch-member to effect the rotation of the platen, of a stop for limiting the throw of the platen, a guide, a head movably received thereon and operatively connected to the stop, and a screw rotatably mounted relative to the guide and threaded in the head to adjust the stop.

31. In a typewriting machine, the combination with a platen, line-spacing mechanism therefor, including clutch-members, one of which is operatively connected to the platen, a lever for actuating the remaining clutch-member to effect the rotation of the platen-connected member, and a platen frame, of an adjustable stop for limiting the throw of the platen, an indicating finger operatively connected with the stop, and graduations located adjacent the slot.

32. In a typewriting machine, the combination with a platen, of a clutch-element operatively connected therewith, a swinging carrier, a clutching dog pivotally mounted on the carrier, and having jaws to bite upon the clutch-element, a returning spring for normally holding the clutching dog in released position relative to the clutch element, in opposition to a weaker spring tending to throw the dog into engagement with the clutch-element, and a lever-actuated arm for overcoming the returning spring, to permit the weaker spring to quickly throw the dog into engagement with the clutch-element to prevent slippage, and for rotating the dog, its carriers, and the clutch-element the required distance.

RICHARD W. UHLIG.

Witnesses:
JOHN O. SEIFERT,
K. FRANKFORT.